Patented May 15, 1923.

1,455,488

UNITED STATES PATENT OFFICE.

HEINRICH GRÜNHAGEN, OF BERLIN-KARLSHORST, GERMANY, ASSIGNOR, BY MESNE ASSIGNMENTS, TO THE CHEMICAL FOUNDATION, INC., A CORPORATION OF DELAWARE.

DYES OF BENZENE-NAPHTHALENE-ACRIDINE SERIES AND THEIR MANUFACTURE.

No Drawing. Application filed July 29, 1916, Serial No. 112,197. Renewed September 10, 1920. Serial No. 409,496.

*To all whom it may concern:*

Be it known that I, HEINRICH GRÜNHAGEN, a citizen of the Empire of Germany, residing at Berlin-Karlshorst, Germany, my P. O. address being Prinz Joachimstr. 13, Berlin-Karlshorst, Germany, have invented certain new and useful Improvements in New Dyes of Benzene-Naphthalene-Acridine Series and Their Manufacture, of which the following is a specification.

My present invention relates to new dyes of the acridine series containing a benzene and a naphthalene nucleus; the general graphic formula of these new dyes corresponds to the formula:

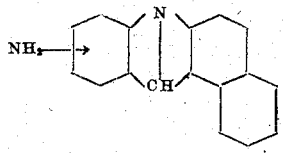

As a specific example the dye of the formula:

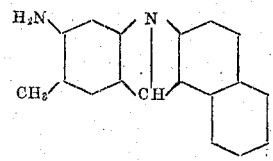

may be given, which produces on leather clear and deep yellow tints. The new dyes are pure products, easily soluble in water, and are not precipitated from the dye-bath by calcium carbonate. Furthermore my new products are level dyeing, and the tints obtained therewith do not change when the leather undergoes the so-called staking operation.

My new and improved process for manufacturing these new dyes consists in heating a formyl derivative of a meta-diamine of the benzene series with a salt of a beta-naphthylamine, and in illustration of my new process the following equation is given:

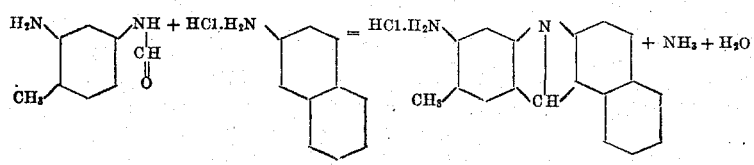

making use, for example, of formyl-meta-toluylenediamine (4-formylamino-2-aminotoluene) and of beta-naphthylamine itself in the form of the hydrochloride.

The yield according to my new process is very good, but it may be further increased by using the formyl compounds in the form of their salts, for instance as hydrochlorides.

My new process may also be carried out in the reversed form, that is to say a salt of a meta-diamine and more especially of a C-alkylated meta-diamine of the benzene series, for instance a hydrochloride, is heated with a formyl derivative of a beta-naphthylamine.

This reaction may be represented for instance by the following equation:

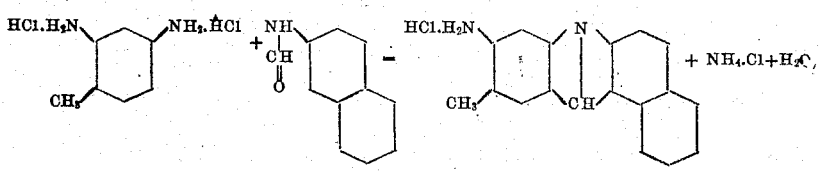

using meta-toluylenediamine as a meta-diamine of the benzene series and a hydrochloride as the salt form.

The following examples will serve as illustrative embodiments of my invention, the parts being by weight:

1. In an enamelled iron vessel provided with an agitator and heated by an oil bath 15 parts of 4-formylamino-2-aminotoluene and 17.9 parts of 2-naphthylamine hydrochloride are melted together, the temperature being gradually raised to about 170–190° C., taking care that the reaction does not become too violent. The reaction being finished the melt is dissolved in boiling water, the solution filtered whilst hot and the dye precipitated from the filtrate with common salt and zinc-chloride. The new dye in the dry state when pulverized forms a brown powder, and dyes leather a clear and deep yellow tint.

2. 13.6 parts of monoformyl-meta-phenylenediamine are melted together with 17.9 parts of 2 - naphthylamine - hydrochloride, the temperature being gradually raised to 170°–190° C. and care being taken that the reaction does not become too violent. The melt may be worked up and the dye precipitated, as indicated in example 1. The new dye thus obtained in the dry state when pulverized forms a dark brown powder and dyes leather orange-yellow tints.

3. 17.1 parts of formyl-2-naphthylamine are heated together with 19.5 parts of metatoluylenediamine-hydrochloride in an enamelled iron vessel provided with an agitator and heated on an oil bath. If so desired, a diluting agent, such as glycerine may be added. The temperature of the reaction may be maintained between 160 and 190° C. The reaction being finished the melt is dissolved in about 600 parts of boiling water, the solution filtered whilst hot and the dye precipitated from the filtrate with common salt and zinc-chloride. The new dye in the dry state when pulverized forms a brown powder, and produces on leather clear and deep yellow tints.

My present invention is not limited to the foregoing examples or to the details and special reaction conditions given therein. Thus for instance it may be desired to employ the 4-formylamino-2-aminotoluene in the form of its hydrochloride. The reaction which proceeds smoothy is favorably influenced thereby. In the same manner instead of monoformyl-meta-phenylenediamine in example 2 the hydrochloric of this compound may be employed. The temperature of reaction and the time of heating may be varied in order to obtain the best results.

Furthermore a formyl derivative of a C- and N-alkylated meta-diamine of the benzene series, such as for instance 4-formylamino-2-dimethylaminotoluene or the corresponding diethyl-compound may be used. Finally instead of beta-naphthylamine itself, for instance, chloro- or bromo-derivatives thereof may be utilized.

The hydrochloride may be replaced by another suitable salt, for instance the sulfate.

Having now described my invention what I claim is,—

1. As new articles of manufacture new dyes of the acridine series the underlying general graphic formula of which corresponds to the formula:

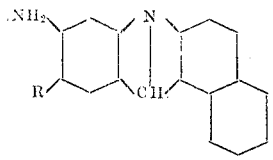

in which R represents hydrogen or an alkyl group.

2. As a new article of manufacture a new dye of the acridine series the constitution of which corresponds to the formula:

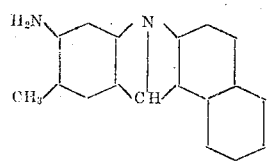

which in the dry state and pulverized forms a brown powder and dyes leather clear and deep yellow tints.

3. As a new process for the manufacture of new dyes of the acridine series the process which consists in heating a formyl derivative of a meta-diamine of the benzene series with a salt of a beta-naphthylamine in equimolecular proportions.

4. As a new process for the manufacture of new dyes of the acridine series the process which consists in heating a formyl derivative of a C-alkylated meta-diamine of the benzene series with a salt of a beta-napththylamine in equimolecular proportions.

5. As a new process for the manufacture of new dyes of the acridine series the process which consists in heating a formyl derivative of meta-toluylenediamine with a salt of a beta-naphthylamine in equimolecular proportions.

6. As a new process for the manufacture of a new dye of the acridine series the process which consists in heating formyl-meta-toluylenediamine with beta-naphthylamine-hydrochloride in equimolecular proportions.

In testimony whereof I affixed my signature in presence of two witnesses.

HEINRICH GRÜNHAGEN.

Witnesses:
  HENRY HASPER,
  ALLEN F. JENNINGS.